United States Patent
Hennequin et al.

(10) Patent No.: US 10,448,395 B2
(45) Date of Patent: Oct. 15, 2019

(54) METHOD OF RADIO COMMUNICATION IN A SYSTEM COMPRISING A PLURALITY OF COMMUNICATING MODULES

(71) Applicant: Schneider Electric Industries SAS, Rueil Malmaison (FR)

(72) Inventors: Michel Hennequin, Crolles (FR); Emmanuel Dreina, Grenoble (FR); Nicolas Cochard, Le Versoud (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 0 days.

(21) Appl. No.: 15/978,591

(22) Filed: May 14, 2018

(65) Prior Publication Data
US 2018/0359748 A1    Dec. 13, 2018

(30) Foreign Application Priority Data
Jun. 13, 2017    (FR) .................................... 17 55280

(51) Int. Cl.
*H04J 3/00* (2006.01)
*H04L 12/56* (2006.01)
(Continued)

(52) U.S. Cl.
CPC ....... *H04W 72/0446* (2013.01); *H04L 5/0055* (2013.01); *H04L 69/28* (2013.01);
(Continued)

(58) Field of Classification Search
CPC ............ H04W 72/0446; H04W 56/00; H04W 56/0045; H04L 5/0055; H04L 69/28; H04Q 9/00
(Continued)

(56) References Cited

U.S. PATENT DOCUMENTS 5,654,968 A  *  8/1997  Smiroldo .............. H04L 12/403
                                                    370/443
5,721,735 A  *  2/1998  Smiroldo .......... H04W 72/0446
                                                    370/442
(Continued)

OTHER PUBLICATIONS

French Preliminary Search Report dated Feb. 7, 2018 in French Application 17 55280, filed on Jun. 13, 2017 (with English Translation of Categories of cited documents & Written Opinion).

*Primary Examiner* — Thai D Hoang
(74) *Attorney, Agent, or Firm* — Oblon, McClelland, Maier & Neustadt, L.L.P.

(57) ABSTRACT

A method of radio communication in a system including a plurality of communicating modules, each communicating module being able to obtain at least one measured physical value and to transmit a message encapsulating at least one measured physical value to a hub device according to a given radio communication protocol, the sending of the message being performed during a communication time interval, defined by a start instant and an end instant, a waiting time separating two successive communication time intervals of one and the same communicating module. For each communicating module of the plurality of communicating modules, the waiting time is calculated as a function of an updated counter of the communicating module as a function of a receipt of an acknowledgement message originating from the hub device.

15 Claims, 6 Drawing Sheets

(51) Int. Cl.
*H04W 72/04* (2009.01)
*H04L 5/00* (2006.01)
*H04L 29/06* (2006.01)
*H04W 56/00* (2009.01)
*H04Q 9/00* (2006.01)
*H04W 74/04* (2009.01)
*H04W 84/18* (2009.01)
*H04J 3/06* (2006.01)

(52) U.S. Cl.
CPC .............. *H04Q 9/00* (2013.01); *H04W 56/00* (2013.01); *H04W 56/0045* (2013.01); *H04J 3/0652* (2013.01); *H04L 2212/00* (2013.01); *H04Q 2209/10* (2013.01); *H04Q 2209/40* (2013.01); *H04Q 2209/43* (2013.01); *H04Q 2209/82* (2013.01); *H04W 74/04* (2013.01); *H04W 84/18* (2013.01)

(58) Field of Classification Search
USPC ................ 370/329–330, 335–337, 342–345, 370/347–348, 389–393, 400–411
See application file for complete search history.

(56) References Cited

U.S. PATENT DOCUMENTS

| | | | |
|---|---|---|---|
| 7,106,843 B1* | 9/2006 | Gainsboro | H04M 3/2281 379/191 |
| 7,492,316 B1* | 2/2009 | Ameti | G01S 5/0009 342/463 |
| 7,773,576 B2* | 8/2010 | Inukai | H04B 7/18584 370/347 |
| 2003/0070031 A1* | 4/2003 | Howard | G06F 1/3203 710/310 |
| 2004/0148539 A1* | 7/2004 | Leydier | G06F 1/04 713/500 |
| 2008/0075005 A1 | 3/2008 | Kim et al. | |
| 2011/0087396 A1 | 4/2011 | Eregen et al. | |
| 2014/0105205 A1 | 4/2014 | Honig et al. | |
| 2014/0112315 A1* | 4/2014 | Yokoo | H04L 5/0094 370/336 |
| 2015/0092732 A1* | 4/2015 | Ho | G06Q 10/06 370/329 |
| 2015/0366518 A1* | 12/2015 | Sampson | G16H 40/63 600/301 |
| 2018/0103859 A1* | 4/2018 | Provenzano | A61B 5/02438 |

* cited by examiner

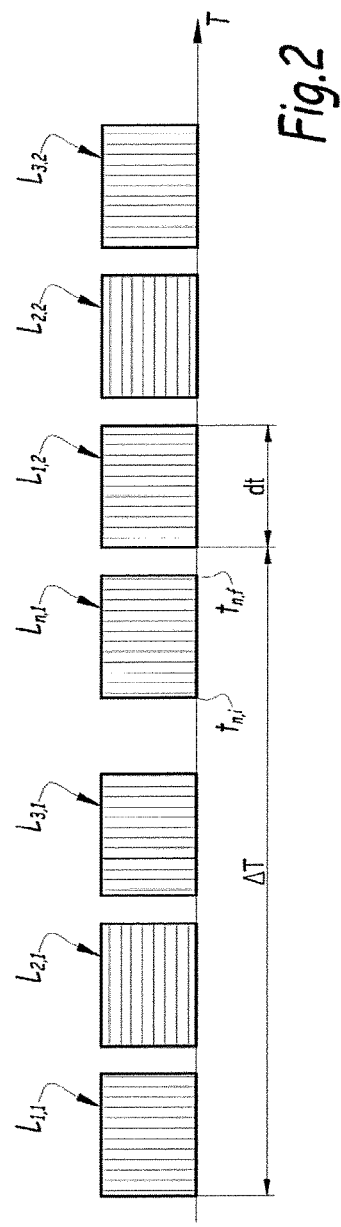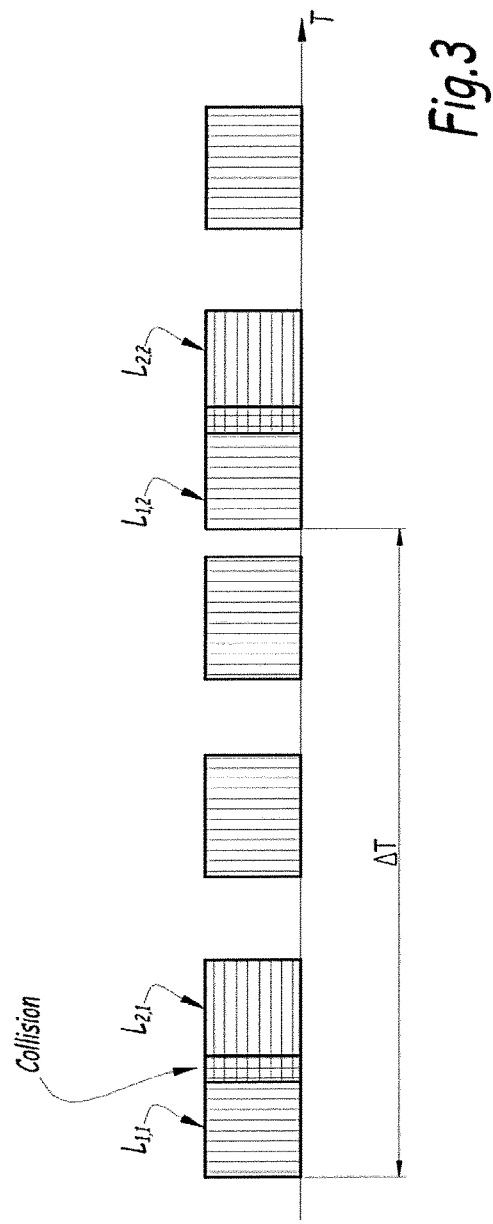

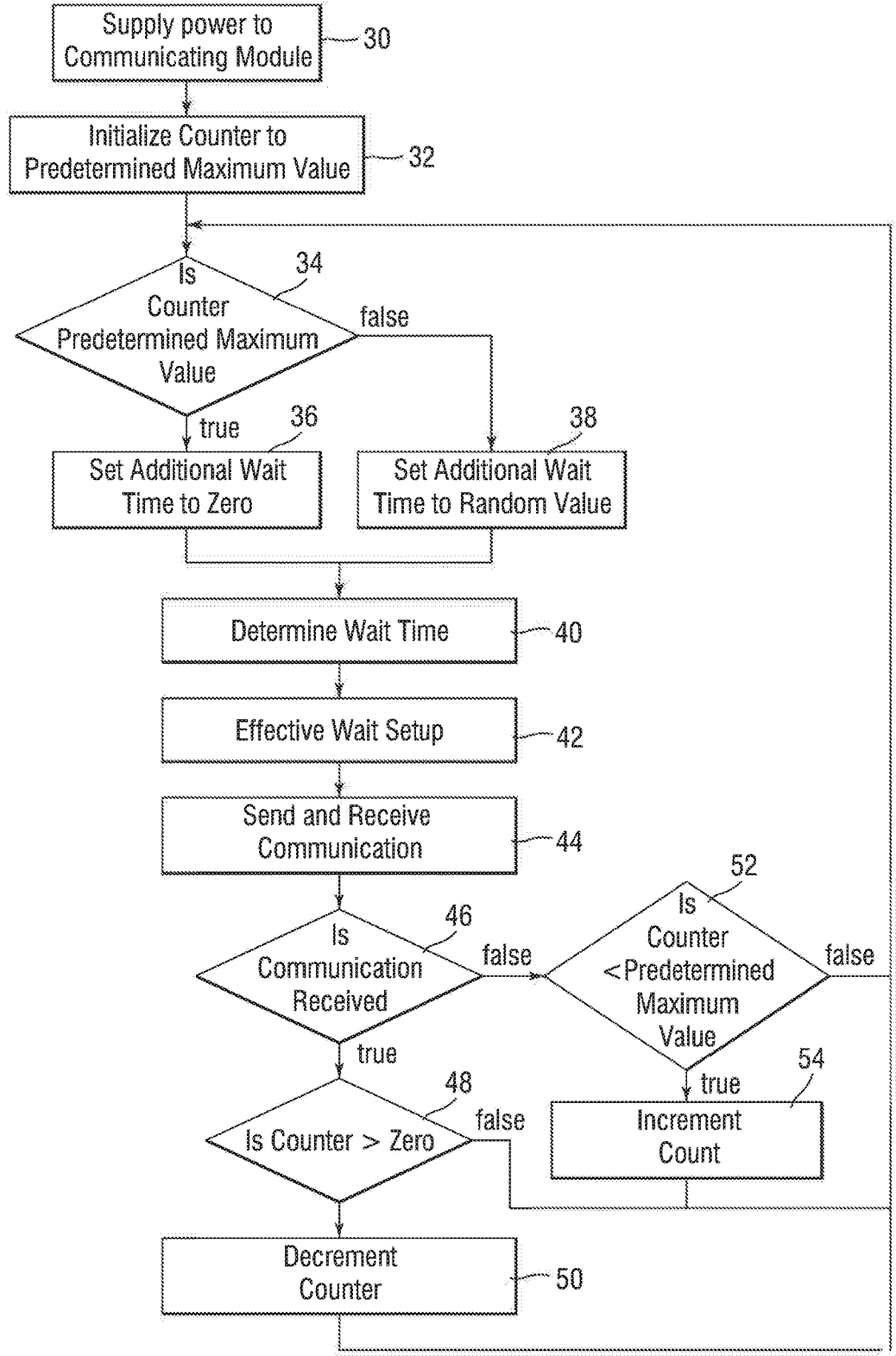

METHOD OF RADIO COMMUNICATION IN A SYSTEM COMPRISING A PLURALITY OF COMMUNICATING MODULES

BACKGROUND OF THE INVENTION

The present invention relates to a method of radio communication in a system comprising a plurality of communicating modules, and an associated radio communication system.

The invention lies in the field of wireless communication performed by communicating modules, especially in electrical installations, the communicating modules being for example modules for measuring one or more physical quantities of the electrical installation.

There exist short-range radio communication protocols, for example Bluetooth (trademark) and ZigBee, adapted for domestic networks.

Diverse communicating modules, for example electrical measurement sensors, temperature or pressure sensors, implement the ZigBee protocol based on the IEEE 802.15.4 communication protocol. The ZigBee protocol exhibits the advantage of reducing the electrical consumption to the strict minimum, while allowing a low data transmission rate which is nevertheless sufficient for the transmission of equipment measurement and control data.

The objective of the ZigBee Green Power protocol is to allow communications between modules with a yet further reduced consumption of electricity.

For example, a system for monitoring and managing electrical installations is considered, comprising a plurality of communicating modules, for example according to the ZigBee Green Power protocol, each adapted to communicate in a bidirectional manner with a hub device, which receives the totality of the measurement information transmitted by the diverse modules and is adapted to aggregate them for subsequent use. From the communications point of view, each communicating module is a node of a star network, centred around the hub device.

In such a communications network, one of the problems which arises is to ensure that each of the communication nodes can send radio frames or messages, without interference or collision with one or more other radio frames sent by other nodes, so as to ensure sufficient quality of service.

A communication scheme known by the name TDMA (for "Time Division Multiple Access") consists in allocating each node a send time interval, repeated periodically.

Each communicating module forming a node of the communication network possesses an internal clock, quartz-based or formed by an RC oscillator, and uses this internal clock to regulate message sends.

However, there is a risk of temporal drift inducing possible temporal superpositions of the send intervals associated with distinct communication nodes. Such a superposition induces a risk of collision, and consequently of loss of one or more messages.

Moreover, such a scheme requires specific intervention for sequencing the time intervals when bringing a plurality of communicating modules into service.

A conventional protocol, the Aloha protocol, making it possible to ensure good quality of service, consists in performing the transmission by the receiver node of an acknowledgement message (or ACK), and, in case of non-receipt of an acknowledgement message, the sender node waits a random time before re-sending the initial message.

On the one hand, when the sender nodes are communicating measurement modules, such as sensors, they do not possess enough energy to remain in permanent or prolonged reception, therefore the listening periods in reception are reduced.

Moreover, more generally, because of the selection of a random waiting time, the risk of collision is increased, therefore the communications system is unstable. Moreover, the time required for each node to find an appropriate send time interval may be very long, and does not have any guaranteed upper limit. Stated otherwise, the system convergence time may turn out to be long.

BRIEF SUMMARY OF THE INVENTION

The objective of the invention is to remedy the drawbacks of the prior art, so as to improve the quality of service in a communications system comprising a plurality of communicating modules.

For this purpose, the invention proposes, according to one aspect, a method of radio communication in a system comprising a plurality of communicating modules, each communicating module being able to obtain at least one measured physical value and to transmit a message encapsulating said at least one measured physical value to a hub device according to a given radio communication protocol, the sending of the message being performed during a communication time interval, defined by a start instant and an end instant, a waiting time separating two successive communication time intervals of one and the same communicating module. The method is such that for each communicating module of the plurality of communicating modules, the waiting time is calculated as a function of a counter, updating said communicating module as a function of a receipt of an acknowledgement message originating from the hub device.

Advantageously, the method of the invention makes it possible, by virtue of the use of a counter in each communicating module, to reduce the instability and to obtain faster convergence.

The radio method of communication according to the invention can also exhibit one or more of the features hereinbelow, taken independently or according to all technically acceptable combinations.

The counter takes an initial value equal to a predetermined maximum value.

Subsequent to a message send and to a receipt of a corresponding acknowledgement message originating from the hub device, the value of the counter is decremented by a predetermined decrementation value.

Subsequent to a message send and in the absence of receipt of an acknowledgement message originating from the hub device during a communication interval, if the value of the counter is strictly less than the predetermined maximum value, the value of the counter is incremented by a predetermined incrementation value.

The decrementation value is different from the incrementation value.

The method comprises, subsequent to a message send and to a receipt, by a communicating module, of a corresponding acknowledgement message originating from the hub device, a step, implemented by said receiver communicating module, of extracting from the acknowledgement message a temporal shift value Δt, positive or negative, to be applied during a following send.

The waiting time is equal either to a predetermined communication period duration if the value of the counter is different from the predetermined maximum value, or to said communication period duration increased by a random additional duration if the value of the counter is equal to the predetermined maximum value.

The method is implemented by each communicating module supplied by an AC electrical voltage distribution network of given frequency, and furthermore comprises a step of detecting timing period as a function of said frequency.

The method comprises the reception of supply voltage values, and for each voltage value, when said value is greater than a first predetermined voltage threshold value or less than a second predetermined voltage threshold value, increasing of a synchronization counter.

When the synchronization counter reaches a predetermined timing period counter value, a timing pulse is sent, said timing pulse serving to determine the instant of start of communication time interval of the communicating module.

According to another aspect, the invention relates to a radio communication system comprising a plurality of communicating modules and a hub device, each communicating module being able to obtain at least one measured physical value and to transmit a message encapsulating said at least one measured physical value to the hub device according to a given radio communication protocol, the sending of the message being performed during a communication time interval, defined by a start instant and an end instant, a waiting time separating two successive communication time intervals of one and the same communicating module. The system is such that each communicating module of the plurality of communicating modules comprises a unit adapted to calculate the waiting time as a function of a counter, updating said communicating module as a function of a receipt of an acknowledgement message originating from the hub device.

The radio communication system according to the invention can also exhibit one or more of the features hereinbelow, taken independently or according to all technically acceptable combinations.

Each communicating module is a module for measuring electrical values of an electrical installation.

At least one communicating module supplied by an AC electrical voltage distribution network of given frequency, and each communicating module supplied by the distribution network implements a detection of timing period as a function of said frequency and a determination of an instant of start of communication time interval as a function of said timing period.

At least one communicating module is adapted to receive an acknowledgement message originating from the hub device and to extract from the acknowledgement message a temporal shift value Δt, positive or negative, to be applied during a following send by said communicating module.

According to another aspect, the invention relates to a computer program comprising instructions for implementing the steps of a method of communication such as is briefly described hereinabove upon the running of the program by a processor of a programmable device.

BRIEF DESCRIPTION OF THE SEVERAL VIEWS OF THE DRAWINGS

Other features and advantages of the invention will emerge from the description given thereof hereinbelow, by way of wholly nonlimiting indication, with reference to the appended figures, among which:

FIG. 2 schematically illustrates a periodic regular allocation of communication time intervals;

FIG. 3 schematically illustrates a collision of communication time intervals;

FIG. 4 is a synopsis of the main steps of a method of communication implemented by a communicating module according to one embodiment;

DETAILED DESCRIPTION OF THE INVENTION

Figure 1:
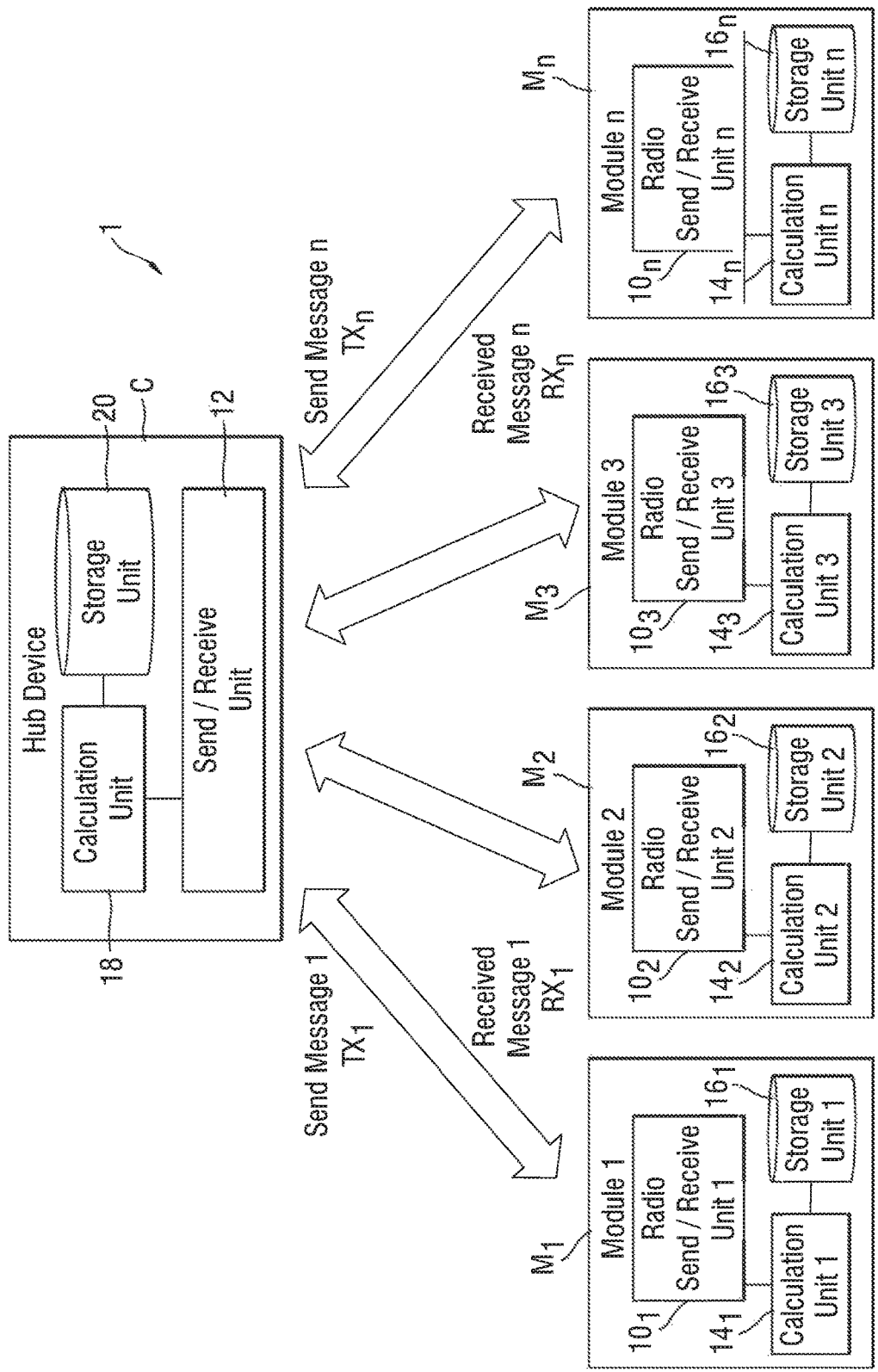
FIG. 1 schematically represents a star communication system in which the radio method of communication according to the invention finds an application.

FIG. 1 schematically illustrates a communications system implementing a method of communication according to the invention.

In this system 1, a plurality of communicating modules, $M_1$ to $M_n$, are able to communicate by a wireless communication protocol with a hub device C.

For example, each of the communicating modules is a measurement module adapted to measure electrical quantities of an electrical installation, for example the current, the voltage, and to transmit communication frames, formatted according to a given communication protocol, and encapsulating measured values.

As a variant, other types of communicating modules are present in the system 1, for example sensors of current, of energy, of temperature, of moisture. Of course, the above list is not exhaustive.

In one embodiment, the communication protocol is the ZigBee Green Power protocol.

Each of the communicating modules $M_1$ to $M_n$ is supplied electrically, either by an electrical supply cable conveying electrical energy provided by a single-phase or three-phase electrical energy provision network, or by an autonomous electrical energy source, for example a cell per communicating module.

The respective electrical supply source of each communicating module is not illustrated in FIG. 1.

The total number n of communicating modules of the system 1 is arbitrary, for example equal to 20.

The hub device C is preferably wired up so as to be supplied by the electrical energy provision network (not illustrated in FIG. 1).

Each of the modules $M_1$ to $M_n$ comprises a radio send/receive unit $10_1$ to $10_n$, adapted to send messages Tx destined for the hub device C, and to receive messages Rx originating from the hub device C.

The messages transmitted and received are formatted according to the chosen communication protocol.

The hub device C comprises a send/receive unit 12, adapted to communicate according to the chosen communication protocol with each of the send/receive units of each of the modules $M_1$ to $M_n$.

From a communications point of view, the system 1 operates according to a star network architecture, having as central communication node the hub device C, each of the communicating modules forming a communication node of the star communications network.

Each of the modules $M_1$ to $M_n$ also comprises a calculation unit $14_1$ to $14_n$, for example a processor, and a data storage unit $16_1$ to $16_n$. The calculation $14_i$ and storage 16 units are able to cooperate to implement a computer program comprising program code instructions making it possible to execute steps of the method of communication according to the invention. Thus, each communicating module is a programmable device adapted to implement program code instructions.

The hub device C also comprises a calculation unit 18, for example a processor, and a data storage unit 20. The calculation 18 and storage 20 units are able to cooperate to implement program code instructions making it possible to execute steps according to one embodiment of the method of communication according to the invention.

FIG. 2 schematically illustrates the principle of reservation of communication time intervals per communicating module, on a time axis, such as it is known.

For each period of duration $\Delta T$, each communicating module $M_1$ to $M_n$ is allocated a communication interval of duration dt comprising a send phase, followed, with optionally a waiting period, by a receive phase, also called a listening phase.

For example, the duration dt is of the order of 10 to 40 milliseconds, and the period $\Delta T$ is of the order of 5 seconds.

For example, in FIG. 2 have been represented a few communication intervals: $L_{1,1}$ for the communicating module $M_1$ during the first send period, $L_{1,2}$ for the communicating module $M_1$ during the second send period, $L_{2,1}$ for the communicating module $M_2$ during the first send period, $L_{2,2}$ for the communicating module $M_2$ during the first send period and so on and so forth.

Each communication interval has a start instant and an end instant, denoted for example $t_{n,i}$ and $t_{n,f}$ for the communicating module $M_n$.

The communication intervals are regularly distributed over the send period, and spaced temporally so as to decrease the risk of collision. The respective start and end instants are regularly distributed in this example.

FIG. 3 illustrates an overlap of the communication intervals associated with the respective communicating modules $M_1$ and $M_2$. Such an overlap is for example due to a drift of the internal clocks of the communicating modules and induces a significant risk of collision or interference between messages sent respectively by the first communicating module $M_1$ and by the second communicating module $M_2$. In this case, at least one of the messages sent risks being corrupted and therefore unusable.

It is clear that the more the total number n of communicating modules increases, the higher the risk of interference.

Conventionally, the hub device C dispatches, via the send/receive unit 12, an acknowledgement message (ACK) to the sender communicating module in case of receipt of an uncorrupted sent message.

As explained in the introduction, preferably, the periods of listening of the communicating modules are limited, so as to avoid overly significant energy consumption.

In case of non-receipt of an acknowledgement message relating to a sent message, a known scheme consists in waiting a random time and returning this message. The instants of start and of end of sending defining the communication intervals of the diverse communicating modules are no longer periodic in time. Such a scheme may induce new collisions, and does not make it possible to guarantee the maximum waiting time before a successful message dispatch.

FIG. 4 is a synopsis of an embodiment of a method of radio communication in a system comprising a plurality of communicating modules in an embodiment of the invention.

The method is implemented by each of the communicating modules $M_1$ to $M_n$ of the system considered.

This method makes it possible to manage the selection of the communication intervals so as to decrease the risk of collision, while guaranteeing that a communicating module dispatches a message in a given maximum time.

A first step 30 consists in supplying electrical power to the current communicating module $M_k$ implementing the method.

Step 30 is followed by a step 32 of initializing a counter, implemented by a variable Counter, to a predetermined maximum value MaxCnt, for example equal to 10. The value MaxCnt is adjustable to any positive integer value, chosen so that the system is stable, for example as a function of an occupancy rate with respect to the maximum communication time for each communicating module.

The value MaxCnt is for example chosen as a function of the number n of communicating modules and of the duration $\Delta T$ of a communication period.

During a step 34 of comparison, the value of the variable Counter is compared with the predetermined value MaxCnt, and it is determined whether the variable Counter is different from the predetermined maximum value MaxCnt.

In case of difference, step 34 of comparison is followed by a step 36 of setting to zero of a variable Jitter representative of the additional waiting time before the start instant of a next communication interval associated with the current communicating module $M_k$.

In case of equality between the value of the variable Counter and of the predetermined value MaxCnt, step 34 of comparison is followed by a step 38 in which the variable Jitter representative of the additional waiting time before the start instant of a next communication interval associated with the current communicating module $M_k$ is set to a random value lying between 0 and $\Delta T$. A random distribution law, for example a law uniform over the interval $[0, \Delta T]$, is applied.

Thereafter in step 40 of determining the waiting time $\text{Att}_k$, for the current communicating module, before the start instant of a next communication interval, the following calculation formula is applied:

$$\text{Att}_k = \Delta T + \text{Jitter}$$

Step 40 of determining the waiting time $\text{Att}_k$ is followed by an effective waiting step 42, of duration equal to the waiting time $\text{Att}_k$ determined.

Thereafter, the communicating module $M_k$ enters a send and receive communication phase 44, for a communication time interval of predetermined duration dt.

For example, in an embodiment, the current communicating module $M_k$ sends a message containing information in respect of measurements of current and/or of voltage destined for the hub device, by point-to-point communication, using the ZigBee Green Power protocol, and then waits for an acknowledgement message ACK originating from the hub device.

Under nominal operation, for the time interval of duration dt, the current communicating module sends a message, waits for and receives an acknowledgement message relating to the message sent.

Quite obviously, it is possible to dispatch several messages during the communication time interval envisaged.

In the following step 46 of acknowledgement verification it is verified whether the acknowledgement message or each acknowledgement message envisaged has been received.

In case of positive verification, therefore if the radio communication has operated, step 46 is followed by a step 48 of comparison making it possible to verify whether the value of the variable Counter is greater than zero.

If the value of the variable Counter is strictly greater than zero, step 48 is followed by a step 50 of decrementing the variable Counter by a predetermined integer decrementation value Dec. For example, the value Dec is equal to 1.

After step 50, the method returns to step 34 described previously.

If the value of the Counter variable is equal to 0, it is left unchanged and step 48 is followed by step 34 described previously.

In case of negative verification in the reception acknowledgement verification step 46, therefore in the case of collision or interference, step 46 is followed by a step 52 of comparing the value of the variable Counter with the predetermined maximum value MaxCnt, so as to determine whether the value of the variable Counter is strictly less than MaxCnt.

If the value of the variable Counter is strictly less than the predetermined value MaxCnt, then the comparison step 52 is followed by a step 54 of incrementing the value of the variable Counter by a predetermined incrementation value Inc. For example, Inc=2.

Preferably, the incrementation value Inc is different from the decrementation value Dec, so as to make the value of the variable Counter evolve in a dissymmetric manner as a function of the receipt or non-receipt of an acknowledgement message.

Advantageously, this makes it possible to avoid remaining in situations of non-continuous cyclic collisions, for example in case of collision every two periods.

In an advantageous embodiment, the incrementation value is greater than the decrementation value.

Step 54 is followed by step 34 described previously.

If the value of the variable Counter is equal to the predetermined value MaxCnt, then step 52 is followed by step 34 described previously. Thus, if the current communicating module has not received any acknowledgement in response to the dispatching of the first message, the value of the variable Counter remains unchanged.

By applying the method described hereinabove, as soon as the value of the variable Counter is different from the predetermined maximum value MaxCnt, the waiting time of the current communicating module is chosen equal to the period ΔT, without adding an additional random waiting time Jitter.

Advantageously, the method described hereinabove in one of its embodiments makes it possible to initialize a system comprising a plurality of communicating modules as soon as they are installed, without any prior phase of determining the communication intervals associated with each of the nodes when bringing them into service.

Indeed, the proposed method of communication allows automatic convergence, each communicating module being adapted to find a collision-free communication time interval.

Advantageously, in case of successful reception, the time intervals are repeated periodically, the waiting time between two time intervals being equal to ΔT.

In order to further improve the communication between communicating modules, whilst limiting the duration of listening for the acknowledgement messages on each communicating module, it is proposed, in an embodiment of the invention, for each communicating module supplied electrically by an electrical energy provision network, to regulate the sending of the messages as a function of the frequency of the AC current provided by this network, so as to decrease the risk of temporal drift.

Figure 5:
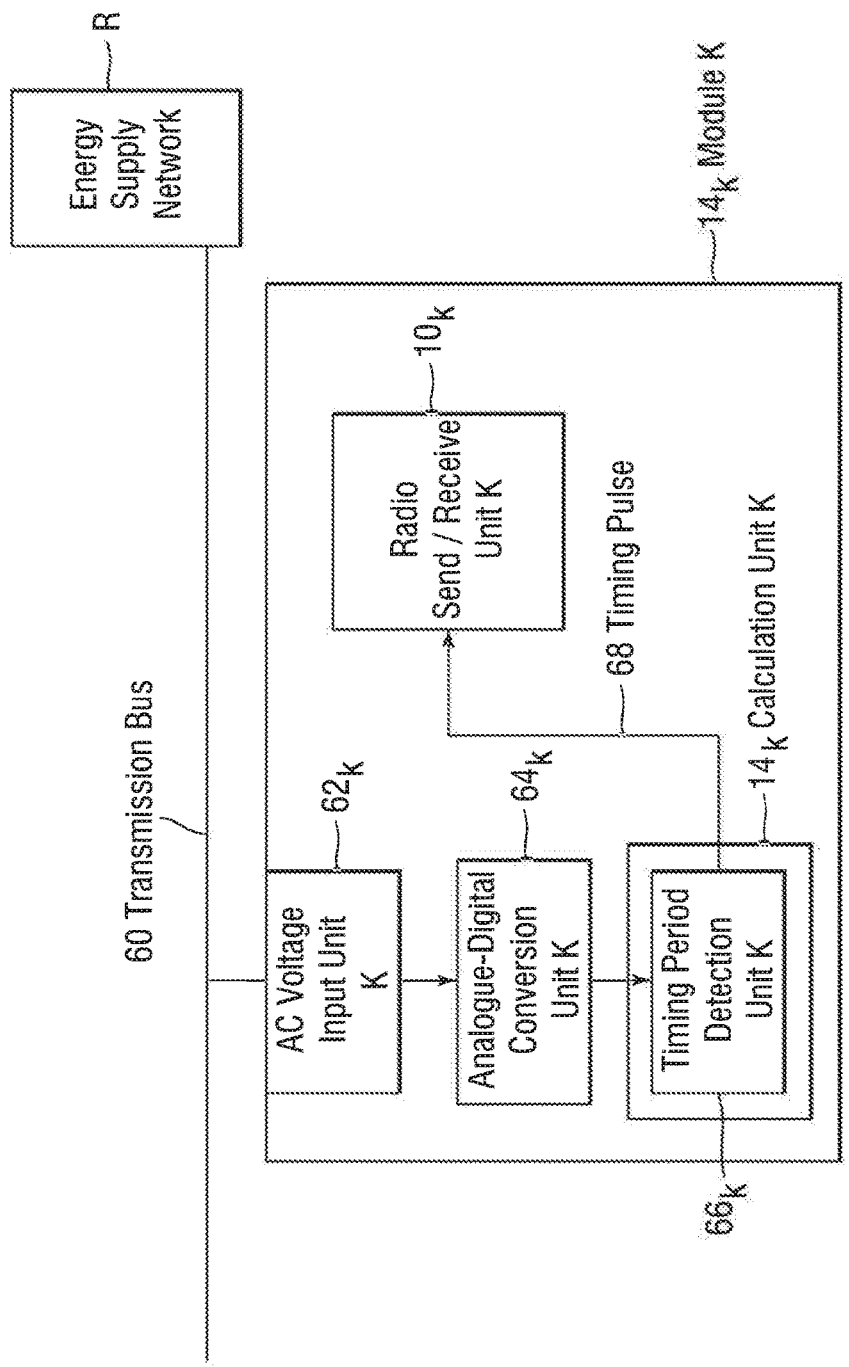
FIG. 5 schematically illustrates a communicating module according to one embodiment.

FIG. 5 schematically illustrates a part of a communicating module $M_k$ connected via a transmission bus 60 to an electrical energy supply network R, providing an AC voltage, on one or more phase conductors. The supply network is therefore either single-phase, or three-phase.

The module $M_k$ comprises a unit $62_k$ for input of AC voltage provided by the network, for example a 50 Hz voltage, and a unit $64_k$ for analogue-digital conversion of one phase only of the supply network.

For example, when the supply network is single-phase, the single voltage phase is selected as reference voltage.

When the supply network is three-phase comprising three phase conductors and a neutral conductor, the voltage of the first phase, denoted V1, is selected as reference voltage. Alternatively, the voltage of the second or of the third phase are used.

The analogue-digital conversion unit $64_k$ provides digital voltage samples V1 to a timing period detection unit $66_k$ adapted to carry out calculations and to dispatch a timing pulse 68 to the radio send/receive unit $10_k$.

For example, a timing pulse 68 is sent every 10 ms for a supply network frequency of 50 Hz.

A first, upper voltage threshold value $V_{max}$ and a second, lower voltage threshold value $V_{min}$ are provided beforehand and stored.

The first voltage threshold value $V_{max}$ is a positive value, and the second voltage threshold value $V_{min}$ is a negative value. For example these values lie between −80V and +80V. In one embodiment, $V_{min}=-V_{max}$.

Advantageously, the same voltage threshold values $V_{max}$ and $V_{min}$ are stored in each of the communicating modules $M_1$ to $M_n$ of the system 1, so as to ensure synchronization between these modules.

Figure 6:
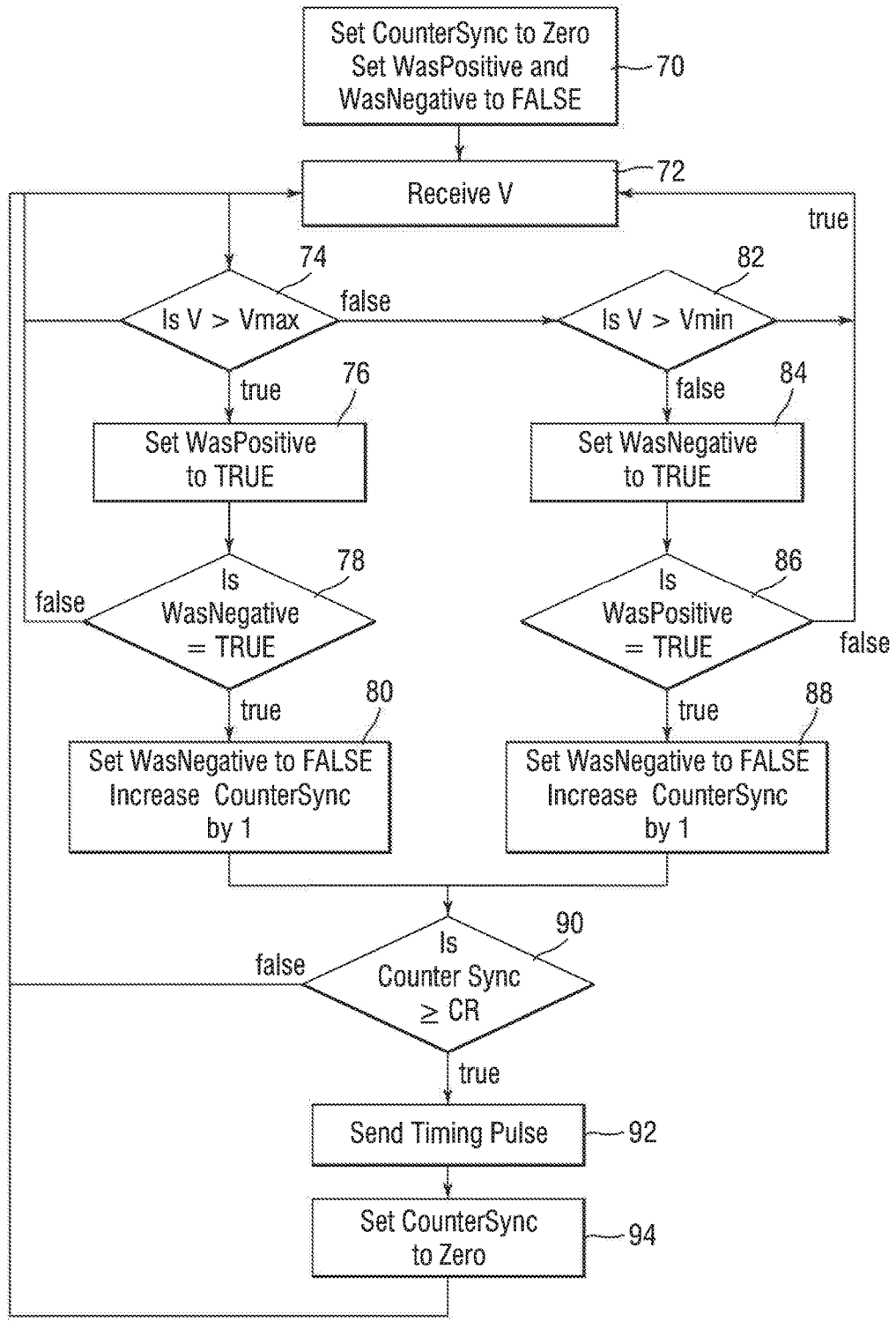
FIG. 6 schematically illustrates the main steps of the synchronization of communicating modules according to one embodiment.

FIG. 6 is a synopsis of the main calculation steps implemented by the timing period detection unit in an embodiment.

During a first initialization step 70, a synchronization counter CounterSync is initialized to zero, and two boolean state variables, called WasPositive and WasNegative are initialized to FALSE.

In the voltage sample reception step 72, a voltage value V is received.

The voltage value V is compared in the comparison step 74 with the first, upper voltage threshold value $V_{max}$. If V is greater than $V_{max}$, step 74 is followed by a step 76 in which the boolean variable WasPositive is set to TRUE.

Step 76 is followed by a step 78 in which it is verified whether the boolean variable WasNegative is equal to TRUE. In case of positive comparison in step 78, this step is followed by a step 80 in which the boolean variable WasNegative is set to FALSE and the synchronization counter CounterSync is increased by 1.

In case of negative comparison in step 78, this step is followed by step 72 described previously.

If the voltage value V is less than $V_{max}$, step 74 is followed by a step 82 of comparing the voltage V with the second, lower voltage threshold value $V_{min}$.

If V is greater than $V_{min}$, step 82 is followed by step 72 described previously.

If V is less than $V_{min}$, step 82 is followed by a step 84 in which the boolean variable WasNegative is set to TRUE.

Step 84 is followed by a step 86 in which it is verified whether the boolean variable WasPositive is equal to TRUE. In case of positive comparison in step 86, this step is followed by a step 88 in which the boolean variable WasPositive is set to FALSE and the synchronization counter CounterSync is increased by 1.

In case of negative comparison in step 86, this step is followed by step 72 described previously.

The respective steps 80 and 88 are followed by a comparison 90 of the synchronization counter with a timing period counter value CP representative of a number of changes of values of states with respect to the values of upper and lower voltage threshold defining a send period.

The timing period counter value is predetermined, for example greater than 10, preferably equal to 500.

If in the comparison step 90, the synchronization counter is greater than or equal to the timing period counter value CP, a timing pulse is sent in step 92, and the synchronization counter is reset to zero in step 94. Otherwise, step 90 is followed by step 72 described previously.

Step 94 is followed by step 72 described previously.

Quite obviously, diverse variants of implementation of a timing period detection unit are conceivable.

It should be noted that the synchronization method described with reference to FIG. 6 is applied so as to limit the temporal clock drift, and makes it possible to improve the communication network formed of the hub device and the communicating modules. The improvement is effective whatever the scheme for selecting communication time intervals associated with each communicating module.

Figure 7:
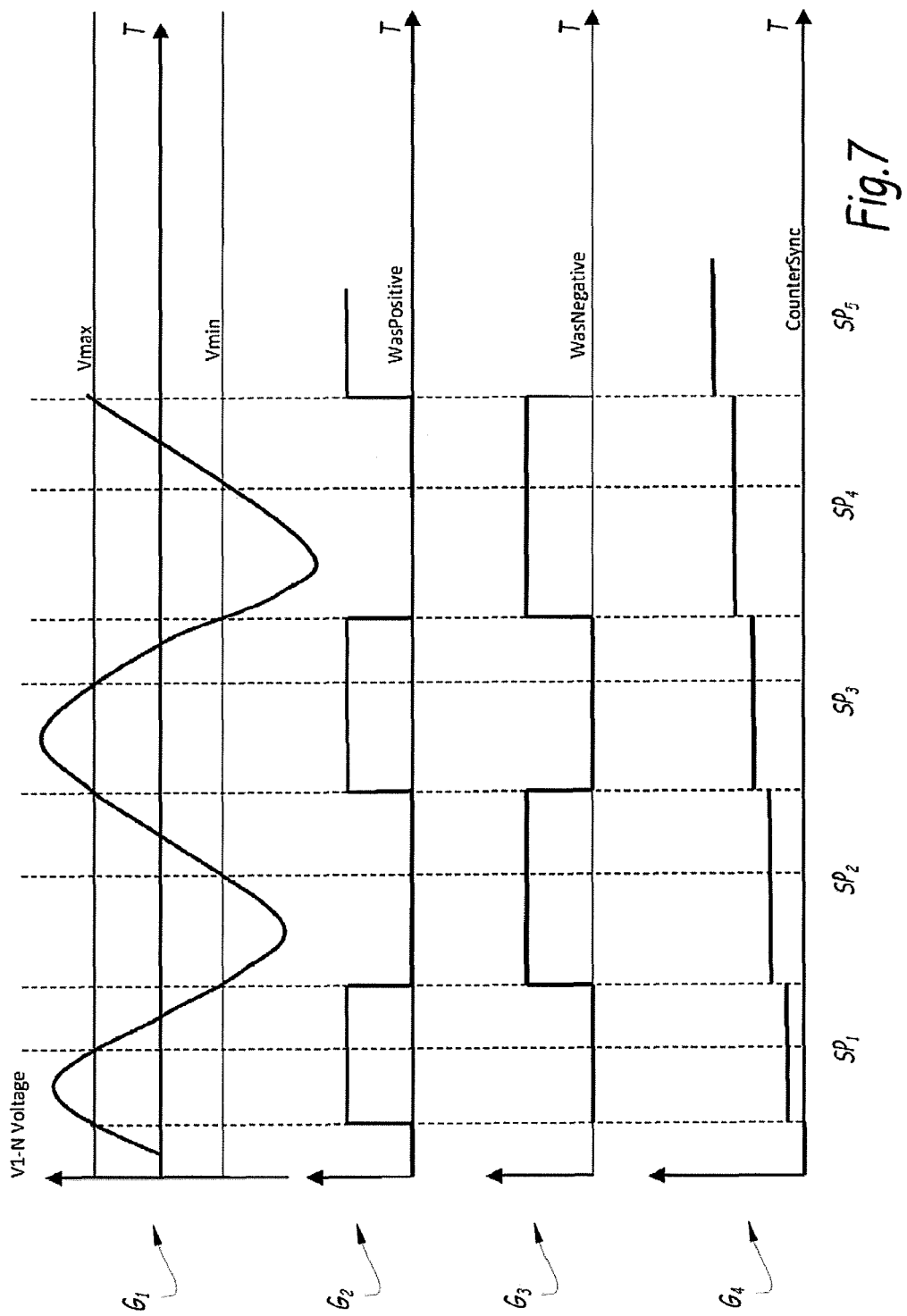
FIG. 7 schematically illustrates the evolution over time of variables as a function of an AC voltage.

FIG. 7 schematically illustrates the evolution of the voltage selected as a function of time in a first graph $G_1$, as well as the first voltage threshold value $V_{max}$ and the second voltage threshold value $V_{min}$.

Below the graph $G_1$ are represented two graphs $G_2$ and $G_3$ representative of the values of the boolean variables WasPositive and WasNegative as a function of time, over several temporal sub-periods.

Finally a last graph $G_4$ represents the value of the synchronization counter CounterSync corresponding to each sub-period.

The graphs $G_1$ to $G_4$ are aligned with respect to the abscissa axis (time axis) which comprises, in the example of FIG. 7, five sub-periods $SP_1$ to $SP_5$, the synchronization counter being increased at each of the sub-periods, each sub-period corresponding to a change of state of the voltage signal with respect to the voltage threshold values $V_{max}$ and $V_{min}$.

Advantageously, each communicating module implements such a timing period detection unit based on one and the same voltage value obtained from the supply network, thereby making it possible to synchronize the communicating modules and to limit the clock drift.

Moreover, advantageously, the implementation of such a unit, for each communicating module supplied with electricity by the distribution network, makes it possible to preserve the synchronization of the communicating modules even in case of stoppage of the hub device.

However, in certain installations, all or some of the communicating modules are not supplied by the electrical supply network, but these modules comprise an autonomous power supply.

In this case, as an alternative, it is envisaged to dispatch synchronization or re-synchronization information to the communicating modules connected on the basis of the hub device.

In this alternative embodiment, the hub device uses the bidirectional communication with each of the communicating modules.

The hub device uses its own internal clock, or an external clock to calculate, on receipt of a message originating from a given communicating module $M_k$, a temporal shift $\Delta t$, positive or negative, to be applied by the communicating module $M_k$ during a following send.

The temporal shift, with an associated sign to indicate whether it is a lead or a lag, is dispatched by the hub device to the communicating module, preferably in the message containing the acknowledgement ACK of receipt.

The recipient communicating module $M_k$ is then able to extract this temporal shift information from the message received and to store it so as to apply the temporal shift indicated during a following send.

This is a method of master-slave synchronization in a network with star topology, the master device being the hub device.

Furthermore, the hub device can, by this same method of dispatching a temporal shift $\Delta t$ to be applied, dispatch instructions to re-arrange the order of the communication time intervals associated with the communicating modules, in such a way that sends of correlated measurement information are grouped together temporally. For example, in an application, it is beneficial to group together an information item, transmitted by a first module, in respect of current and an information item, transmitted by a second module, in respect of temperature, the corresponding measurements being performed substantially at the same time, so as to obtain at intervals of a few milliseconds these correlated information items.

In another embodiment, certain of the communicating modules of a communication system are supplied by autonomous energy sources, and other modules are supplied by an electrical energy supply network. In this embodiment, the diverse embodiments of the invention that were described hereinabove are combined, so as to allow each communicating module to determine the optimized communication intervals for avoiding possible collisions or interference.

The invention claimed is:

1. A method of radio communication in a system comprising a plurality of communicating modules, each communicating module being able to obtain at least one measured physical value and to transmit a message encapsulating said at least one measured physical value to a hub device according to a given radio communication protocol, the sending of the message being performed during a communication time interval, defined by a start instant and an end instant, a waiting time separating two successive communication time intervals of one and the same communicating module:
   wherein each communicating module of the plurality of communicating modules, the waiting time is calculated as a function of an updated counter of said communicating module as a function of a receipt of an acknowledgement message originating from the hub device.

2. The method of communication according to claim 1, wherein said counter takes an initial value equal to a predetermined maximum value.

3. The method of communication according to claim 2, wherein, subsequent to a message send and to a receipt of a corresponding acknowledgement message originating from the hub device, the value of the counter is decremented by a predetermined decrementation value.

4. The method of communication according to claim 3, wherein, subsequent to a message send and in the absence of receipt of an acknowledgement message originating from the hub device during a communication interval, if the value of the counter is strictly less than the predetermined maximum value, the value of the counter is incremented by a predetermined incrementation value.

5. The method of communication according to claim 4, wherein the decrementation value is different from the incrementation value.

6. The method of communication according to claim 2, comprising, subsequent to a message send and to a receipt, by a communicating module, of a corresponding acknowledgement message originating from the hub device, a step, implemented by said receiver communicating module, of extracting from the acknowledgement message a temporal shift value $\Delta t$, positive or negative, to be applied during a following send.

7. The method of communication according to claim 2, wherein the calculated waiting time is equal either to a predetermined communication period duration if the value of the counter is different from the predetermined maximum value, or to said communication period duration increased by a random additional duration if the value of the counter is equal to the predetermined maximum value.

8. The method of communication according to claim 1, implemented by each communicating module supplied by an AC electrical voltage distribution network of given frequency, furthermore comprising a step of detecting timing period as a function of said frequency.

9. The method of communication according to claim 8, comprising the reception of supply voltage values, and for each voltage value, when said value is greater than a first predetermined voltage threshold value or less than a second predetermined voltage threshold value, increasing of a synchronization counter.

10. The method of communication according to claim 9, wherein when the synchronization counter reaches a predetermined timing period counter value, a timing pulse is sent, said timing pulse serving to determine the instant of start of communication time interval of the communicating module.

11. A computer program comprising instructions for implementing the steps of a method of communication in accordance with claim 1 upon the running of the program by a processor of a programmable device.

12. A radio communication system comprising a plurality of communicating modules and a hub device, each communicating module being able to obtain at least one measured physical value and to transmit a message encapsulating said at least one measured physical value to the hub device according to a given radio communication protocol, the sending of the message being performed during a communication time interval, defined by a start instant and an end instant, a waiting time separating two successive communication time intervals of one and the same communicating module, wherein each communicating module of the plurality of communicating modules comprises a unit adapted to calculate the waiting time as a function of a counter, updating said communicating module as a function of a receipt of an acknowledgement message originating from the hub device.

13. A communication system according to claim 12, wherein each communicating module is a module for measuring electrical values of an electrical installation.

14. The communication system according to claim 12, wherein at least one communicating module supplied by an AC electrical voltage distribution network of given frequency, and wherein each communicating module supplied by the distribution network implements a detection of timing period as a function of said frequency and a determination of an instant of start of communication time interval as a function of said timing period.

15. The communication system according to claim 12, wherein at least one communicating module is adapted to receive an acknowledgement message originating from the hub device and to extract from the acknowledgement message a temporal shift value $\Delta t$, positive or negative, to be applied during a following send by said communicating module.

* * * * *